United States Patent
Patel et al.

(10) Patent No.: US 11,783,382 B2
(45) Date of Patent: Oct. 10, 2023

(54) SYSTEMS AND METHODS FOR CURATING CONTENT METADATA

(71) Applicant: Comcast Cable Communications, LLC, Philadelphia, PA (US)

(72) Inventors: Pritesh Patel, Hatfield, PA (US); Robert Dandrea, Furlong, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 272 days.

(21) Appl. No.: 14/520,819

(22) Filed: Oct. 22, 2014

(65) Prior Publication Data

US 2016/0117739 A1    Apr. 28, 2016

(51) Int. Cl.
*G06Q 30/00*  (2023.01)
*G06Q 30/0241* (2023.01)
*G06Q 50/00*  (2012.01)

(52) U.S. Cl.
CPC ......... *G06Q 30/0277* (2013.01); *G06Q 50/01* (2013.01)

(58) Field of Classification Search
CPC ............................ G06Q 30/0277; G06Q 50/01
See application file for complete search history.

(56) References Cited

U.S. PATENT DOCUMENTS

| | | | |
|---|---|---|---|
| 5,287,489 A | 2/1994 | Nimmo et al. | |
| 5,321,750 A | 6/1994 | Nadan | |
| 5,353,121 A | 10/1994 | Young et al. | |
| 5,485,221 A | 1/1996 | Banker et al. | |
| 5,521,841 A | 5/1996 | Arman et al. | |
| 5,530,939 A | 6/1996 | Mansfield, Jr. et al. | |
| 5,583,563 A | 12/1996 | Wanderscheid et al. | |
| 5,589,892 A | 12/1996 | Knee et al. | |
| 5,592,551 A | 1/1997 | Lett et al. | |
| 5,594,509 A | 1/1997 | Florin et al. | |

(Continued)

FOREIGN PATENT DOCUMENTS

| | | |
|---|---|---|
| EP | 0624039 A2 | 11/1994 |
| EP | 0963115 A1 | 12/1999 |

(Continued)

OTHER PUBLICATIONS

Nov. 2, 20179—Canadian Office Action—CA 2,685,833.

(Continued)

*Primary Examiner* — Meredith A Long
(74) *Attorney, Agent, or Firm* — Banner & Witcoff, Ltd.

(57) ABSTRACT

Methods and systems relating to generating and correlating metadata with a content item are disclosed. For example, a computing device may generate one or more timestamp indicators to be associated with a content item. Each timestamp indicator may be correlated to metadata and may be associated with a time point or time interval in a duration of the content item. A requesting device may generate a request for metadata that may comprise an identifier of a timestamp indicator. The request may be generated, for example, based on determining a user of the device is requesting display of an interactive application. Upon receiving a metadata request comprising an identifier of a timestamp indicator, a computing device may transmit metadata correlated to the timestamp indicator to the requesting device or to another user device.

18 Claims, 8 Drawing Sheets

| TIMESTAMP INDICATOR | RELATED INFORMATION | SOCIAL MEDIA APPLICATION | WEB BROWSER APPLICATION |
|---|---|---|---|
| 440e – CHANNEL X (460) | BRAND F COMPANY INFORMATION (470) | @BRAND_F, #NEW_FROM_F (480) | URI:http://www.brandf.com/promo.aspx (490) |
| 440b – CHANNEL W – LOCAL (461) | ACTOR A INFORMATION | @ACTOR_A | URI:http://www.newmovie.com |
| 440a – CHANNEL Z | PROGRAM 3 INFORMATION | "WATCHING #PROGRAM_3!" | URI:http://www.program3.com |
| 440d – CHANNEL Z (463) | PROGRAM 3 INFORMATION | "#EVENT_M JUST HAPPENED!" | URI:http://www.program3.com |
| 440g – CHANNEL Z (464) | TIMESTAMP: 440d | N/A | N/A |
| 410e – CHANNEL D (465) | NATIONAL COMMERCIAL INFORMATION | @NATIONAL_COMMERCIAL | URI:http://www.Ncommercial.com/alt_promo.flv#0seconds |
| 410f – CHANNEL D (466) | NATIONAL COMMERCIAL INFORMATION | @NATIONAL_COMMERCIAL | URI:http://www.Ncommercial.com/alt_promo.flv#60seconds |
| 410g – CHANNEL D (467) | NATIONAL COMMERCIAL INFORMATION | @NATIONAL_COMMERCIAL | URI:http://www.Ncommercial.com/alt_promo.flv#120seconds |
| 440e – CHANNEL X (468) | ACTOR X INFORMATION | @ACTOR_X, #NEW_FROM_F | URI:http://www.brandf.com/promo.aspx |

(56) References Cited

U.S. PATENT DOCUMENTS

| | | |
|---|---|---|
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette et al. |
| 5,737,552 A | 4/1998 | Lavallee et al. |
| 5,802,284 A | 9/1998 | Karlton et al. |
| 5,826,102 A | 10/1998 | Escobar et al. |
| 5,844,620 A | 12/1998 | Coleman et al. |
| 5,850,218 A | 12/1998 | LaJoie et al. |
| 5,852,435 A | 12/1998 | Vigneaux et al. |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt et al. |
| 5,905,492 A | 5/1999 | Straub et al. |
| 5,929,849 A | 7/1999 | Kikinis |
| 5,945,987 A | 8/1999 | Dunn |
| 5,960,194 A | 9/1999 | Choy et al. |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,803 A | 12/1999 | Rowe et al. |
| 6,008,836 A | 12/1999 | Bruck et al. |
| 6,016,144 A | 1/2000 | Blonstein et al. |
| 6,025,837 A | 2/2000 | Matthews, III et al. |
| 6,038,560 A | 3/2000 | Wical |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons et al. |
| 6,477,705 B1 | 11/2002 | Yuen et al. |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,530,082 B1 | 3/2003 | Del Sesto et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,694,312 B2 | 2/2004 | Kobayashi et al. |
| 6,698,020 B1 | 2/2004 | Zigmond et al. |
| 6,704,359 B1 | 3/2004 | Bayrakeri et al. |
| 6,731,310 B2 | 5/2004 | Craycroft et al. |
| 6,745,367 B1 | 6/2004 | Bates et al. |
| 6,760,043 B2 | 7/2004 | Markel |
| 6,763,522 B1 | 7/2004 | Kondo et al. |
| 6,766,526 B1 | 7/2004 | Ellis |
| 6,806,887 B2 | 10/2004 | Chernock et al. |
| 6,857,128 B1 | 2/2005 | Borden, IV et al. |
| 6,886,029 B1 | 4/2005 | Pecus et al. |
| 6,910,191 B2 | 6/2005 | Segerberg et al. |
| 6,918,131 B1 | 7/2005 | Rautila et al. |
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris et al. |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,177,861 B2 | 2/2007 | Tovinkere et al. |
| 7,197,715 B1 | 3/2007 | Valeria |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 | 11/2007 | Krieger et al. |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,472,137 B2 | 12/2008 | Edelstein et al. |
| 7,490,092 B2 | 2/2009 | Sibley et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 3,006,262 A1 | 8/2011 | Rodriguez et al. |
| 3,032,914 A1 | 10/2011 | Rodriguez |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1 | 2/2013 | Khosla |
| 8,434,109 B2 | 4/2013 | Kamimaeda et al. |
| 8,448,208 B2 | 5/2013 | Moreau et al. |
| 8,660,545 B1 | 2/2014 | Redford et al. |
| 8,699,862 B1 | 4/2014 | Sharifi et al. |
| 8,793,256 B2 | 7/2014 | McIntire et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,363,560 B2 | 6/2016 | Moreau et al. |
| 9,473,548 B1* | 10/2016 | Chakrovorthy ...... H04N 21/431 |
| 9,516,253 B2 | 12/2016 | De Andrade et al. |
| 2001/0014206 A1 | 8/2001 | Artigalas et al. |
| 2001/0027563 A1 | 10/2001 | White et al. |
| 2001/0049823 A1 | 12/2001 | Matey |

(56) References Cited

U.S. PATENT DOCUMENTS

| | | |
|---|---|---|
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0104083 A1 | 8/2002 | Hendricks et al. |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0124256 A1 | 9/2002 | Suzuka |
| 2002/0144268 A1 | 10/2002 | Khoo et al. |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1* | 10/2002 | Mitchell ............... H04N 7/165 725/135 |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0023975 A1 | 1/2003 | Schrader et al. |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093760 A1 | 5/2003 | Suzuki et al. |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge et al. |
| 2004/0019908 A1 | 1/2004 | Williams et al. |
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1 | 7/2005 | Baumgartner |
| 2005/0204385 A1 | 9/2005 | Sull et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1* | 4/2006 | Nishikawa ........ G06F 17/30849 725/89 |
| 2006/0105793 A1 | 5/2006 | Gutowski et al. |
| 2006/0125962 A1 | 6/2006 | Shelton et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |

(56) References Cited

U.S. PATENT DOCUMENTS

| | | |
|---|---|---|
| 2007/0050343 A1 | 3/2007 | Siddaramappa et al. |
| 2007/0064715 A1 | 3/2007 | Lloyd et al. |
| 2007/0112761 A1 | 5/2007 | Xu et al. |
| 2007/0157247 A1 | 7/2007 | Cordray et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0092201 A1 | 4/2008 | Agarwal et al. |
| 2008/0113504 A1 | 5/2008 | Lee et al. |
| 2008/0126109 A1 | 5/2008 | Cragun et al. |
| 2008/0133504 A1 | 6/2008 | Messer et al. |
| 2008/0148317 A1 | 6/2008 | Opaluch |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0282294 A1 | 11/2008 | Carpenter et al. |
| 2008/0288641 A1 | 11/2008 | Messer et al. |
| 2008/0288644 A1 | 11/2008 | Gilfix et al. |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0023966 A1 | 1/2010 | Shahraray et al. |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0176787 A1 | 7/2011 | DeCamp |
| 2011/0209180 A1 | 8/2011 | Ellis et al. |
| 2011/0211813 A1* | 9/2011 | Marks ................. G06F 17/3089 386/297 |
| 2011/0214143 A1 | 9/2011 | Rits et al. |
| 2011/0219386 A1* | 9/2011 | Hwang ............ G06F 17/30852 719/328 |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2011/0289098 A1 | 11/2011 | Oztaskent et al. |
| 2012/0002111 A1 | 1/2012 | Sandoval et al. |
| 2012/0011550 A1* | 1/2012 | Holland ............. H04N 21/4126 725/78 |
| 2012/0054811 A1 | 3/2012 | Spears |
| 2012/0066602 A1 | 3/2012 | Chai et al. |
| 2012/0117151 A1 | 5/2012 | Bill |
| 2012/0185905 A1 | 7/2012 | Kelley |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0007043 A1 | 1/2013 | Phillips |
| 2013/0014155 A1* | 1/2013 | Clarke ............. G06F 17/30026 725/32 |
| 2013/0040623 A1 | 2/2013 | Chun et al. |
| 2013/0051770 A1* | 2/2013 | Sargent ............ H04N 21/23418 386/278 |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0176493 A1 | 7/2013 | Khosla |
| 2013/0198642 A1* | 8/2013 | Carney ................. G06F 3/0484 715/738 |
| 2013/0262997 A1 | 10/2013 | Markworth et al. |
| 2013/0298038 A1 | 11/2013 | Spivack et al. |
| 2013/0316716 A1* | 11/2013 | Tapia ............. H04W 72/048 455/450 |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0332855 A1 | 12/2013 | Roman et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0026068 A1 | 1/2014 | Park et al. |
| 2014/0032473 A1 | 1/2014 | Enoki et al. |
| 2014/0053078 A1 | 2/2014 | Kannan |
| 2014/0068648 A1* | 3/2014 | Green ................ H04N 21/4394 725/18 |
| 2014/0089423 A1 | 3/2014 | Jackels |
| 2014/0089967 A1 | 3/2014 | Mandalia et al. |
| 2014/0129570 A1* | 5/2014 | Johnson ............ H04N 21/4126 707/748 |
| 2014/0149918 A1 | 5/2014 | Asokan et al. |
| 2014/0150022 A1 | 5/2014 | Oh et al. |
| 2014/0237498 A1* | 8/2014 | Ivins ..................... G06Q 30/02 725/14 |
| 2014/0267931 A1* | 9/2014 | Gilson ................. H04N 5/4403 348/734 |
| 2014/0279852 A1* | 9/2014 | Chen ................. G06F 17/30023 707/609 |
| 2014/0280695 A1* | 9/2014 | Sharma ............. H04L 67/1095 709/217 |
| 2014/0282122 A1* | 9/2014 | Mathur ................. G06F 3/0482 715/762 |
| 2014/0325359 A1 | 10/2014 | Vehovsky et al. |
| 2014/0327677 A1 | 11/2014 | Walker |
| 2014/0334381 A1 | 11/2014 | Subramaniam et al. |
| 2014/0359662 A1 | 12/2014 | Packard et al. |
| 2014/0365302 A1 | 12/2014 | Walker |
| 2014/0373032 A1* | 12/2014 | Merry ..................... G06F 9/54 719/328 |

(56) References Cited

U.S. PATENT DOCUMENTS

| | | |
|---|---|---|
| 2015/0020096 A1 | 1/2015 | Walker |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 1058999 A1 | 12/2000 |
| EP | 1080582 A1 | 3/2001 |
| GB | 2323489 A | 9/1998 |
| GB | 2448874 A | 11/2008 |
| GB | 2448875 A | 11/2008 |
| WO | 9963757 A1 | 12/1999 |
| WO | 0011869 A1 | 3/2000 |
| WO | 0033576 A1 | 6/2000 |
| WO | 0110115 A1 | 2/2001 |
| WO | 0182613 A1 | 11/2001 |
| WO | 2001084830 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 2003/026275 A2 | 3/2003 |
| WO | 2007115224 A2 | 10/2007 |
| WO | 2008053132 A1 | 5/2008 |
| WO | 2011/053271 A1 | 5/2011 |
| WO | 2012/094105 A1 | 7/2012 |
| WO | 2012/154541 A1 | 11/2012 |

OTHER PUBLICATIONS

European Patent Application No. 09175979.5—Office Action dated Dec. 13, 2011.
Canadian Patent Application No. 2,685,833—Office Actoin dated Jan. 20, 2012.
Li, Y. et al. "Reliable Video Clock Time Recognition", Pattern Recognition, 2006, 1CPR 1006, 18th International Conference on Pattern Recognition, 4 pages.
European Search Report dated Mar. 1, 2010.
Salton et al., Computer Evaluation of Indexing and Text Processing Journal of the Association for Computing Machinery, vol. 15, No. 1, Jan. 1968, pp. 8-36.
Smith, J.R. et al., An Image and Video Search Engine for the World-Wide Web Storage and Retrieval for Image and Video Databases 5, San Jose, Feb. 13-14, 1997, Proceedings of Spie, Belingham, Spie, US, vol. 3022, Feb. 13, 1997, pp. 84-95.
Messer, Alan et al., "SeeNSearch: A context Directed Search Facilitator for Home Entertainment Devices", Paper, Samsung Information Systems America Inc., San Jose, CA, 2008.
Changsheng Xu et al., "Using Webcast Text for Semantic Event Detection in Broadcast Sports Video", IEEE Transactions on Multimedia, vol. 10, No. 7, pp. 1342-1355, Nov. 2008.
Liang Bai et al., "Video Semantic Content Analysis based on Ontology", International Machine Vision and Image Processing Conference, pp. 117-124, Sep. 2007.
Steffan Staab et al., "Semantic Multimedia", Reasoning Web; Lecture Notes in Computer Science, pp. 125-170, Sep. 2008.
European Search Report for Application No. 09180776.8, dated Jun. 7, 2010, 9 pages.
European Search Report, EP 09 18 0762, completion date Mar. 22, 2010.
European Search Report dated Jun. 4, 2010.
EP Application No. 09 179 987.4-1241—Office Action dated Feb. 15, 2011.
European Application No. 09 175 979.5—Office Action dated Apr. 11, 2011.
Fernando Pereira, "The MPEG-4 Book", Prentice Hall, Jul. 10, 2002.
Michael Adams, "Open Cable Architecture", Cisco Press, Dec. 3, 1999.
Andreas Kraft and Klaus Hofrichter, "An Approach for Script-Based Broadcast Application Production", Springer-Verlag Berlin Heidelberg, pp. 74-82, 1999.
Mark Riehl, "XML and Perl", Sams, Oct. 16, 2002.
MetaTV, Inc., PCT/US02/29917 filed Sep. 19, 2002, International Search Report dated Apr. 14, 2003; ISA/US; 6 pages.
Sylvain Devillers, "Bitstieam Syntax Definition Language: an Input to MPEG-21 Content Representation", Mar. 2001, ISO, ISO/IEC JTC1/SC29/WG11 MPEG01/M7053.
Shim, et al., "A SMIL Based Graphical Interface for Interactive TV", Internet Tech. Laboratory Dept. of Comp. Engineering, San Jose State University, pp. 257-266, 2003.
Yoon, et al., "Video Gadget: MPET-7 Based Audio-Visual Content Indexing and Browsing Engine", LG Electronics Institute of Technology, 2001, pp. 59-68.
Watchwith webpage; http://www.watchwith.com/content_owners/watchwith_plalform_components.jsp (last visited Mar. 12, 2013).
Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).
"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).
Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Canadian Office Action—CA 2,685,833—dated Jan. 22, 2015.
European Extended Search Report—EP 13192112.4—dated May 11, 2015.
CA Response to Office Action—CA Appl. 2,685,833—dated Jul. 17, 2015.
Response to European Office Action—European Appl. 13192112.4—dated Dec. 9, 2015.
CA Office Action—CA App 2,685,833—dated Jan. 27, 2016.
European Office Action—EP App 14159227.9—dated Jul. 12, 2016.
Agnieszka Zagozdzinnska et al. "TRIDAQ Systems in HEP Experiments at LHC Accelerator" Kwartalnik Elektroniki I Telekomunikacji, vol. 59, No. 4, Oct. 2013.
CA Office Action—CA Application 2685833—dated Feb. 8, 2017.
Feb. 19, 2018—European Summons to Oral Proceedings—EP 14159227.9.
Mar. 9, 2018—European Office Action—EP 13192112.4.
Jul. 31, 2018—European Decision to Refuse—14159227.9.
Kontothoanassis, Ledonias et al., "Design, Implementation, and Analysis of a Multimedia Indexing and Delivery Server", Technical Report Series, Aug. 1999, Cambridge Research Laboratory.
Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.
Koskela M. et al., "Measuring Concept Similarities in Multimedia Ontologies: Analysis and Evaluations", IEEE Transactions on Multimedia, vol. 9, No. 5, pp. 912-922, Aug. 2007.
Aug. 24, 2020, Canadian Office Action, CA 2,832,800.
Oct. 31, 2022—CA Office Action—CA App. No. 2,832,800.

* cited by examiner

| TIMESTAMP INDICATOR | RELATED INFORMATION | SOCIAL MEDIA APPLICATION | WEB BROWSER APPLICATION |
|---|---|---|---|
| 440e – CHANNEL X (460) | BRAND F COMPANY INFORMATION (470) | @BRAND_F, #NEW_FROM_F (480) | URI:http://www.brandf.com/promo.aspx (490) |
| 440b – CHANNEL W – LOCAL (461) | ACTOR A INFORMATION | @ACTOR_A | URI:http://www.newmovie.com |
| 440a – CHANNEL Z | PROGRAM 3 INFORMATION | "WATCHING #PROGRAM_3!" | URI:http://www.program3.com |
| 440d – CHANNEL Z (463) | PROGRAM 3 INFORMATION | "#EVENT_M JUST HAPPENED!" | URI:http://www.program3.com |
| 440g – CHANNEL Z (464) | TIMESTAMP: 440d | N/A | N/A |
| 410e – CHANNEL D (465) | NATIONAL COMMERCIAL INFORMATION | @NATIONAL_COMMERCIAL | URI:http://www.Ncommercial.com/alt_promo.flv#0seconds |
| 410f – CHANNEL D (466) | NATIONAL COMMERCIAL INFORMATION | @NATIONAL_COMMERCIAL | URI:http://www.Ncommercial.com/alt_promo.flv#60seconds |
| 410g – CHANNEL D (467) | NATIONAL COMMERCIAL INFORMATION | @NATIONAL_COMMERCIAL | URI:http://www.Ncommercial.com/alt_promo.flv#120seconds |
| 440e – CHANNEL X (468) | ACTOR X INFORMATION | @ACTOR_X, #NEW_FROM_F | URI:http://www.brandf.com/promo.aspx |

FIG. 4C

SYSTEMS AND METHODS FOR CURATING CONTENT METADATA

BACKGROUND

Interaction between consumers of content is increasing. When notable events occur in live and scripted content, consumers have a desire to reach out and share their thoughts and emotions on what they are witnessing, for example, via social media. These thoughts and emotions in turn form a secondary aspect of the content experience for other viewers. In some cases, the reactions of other viewers become nearly as memorable as the original content.

Additionally, the lines between content and advertising are blurring. Rather than merely describing all the features of the product or service being offered, advertisers employ a variety of techniques such as product placement and high-concept commercials to spark and heighten consumer interest. These experiences engage the consumer throughout print, audio, video, and interactive media.

SUMMARY

Some aspects of the disclosure relate to methods and systems for generating and correlating content metadata to a displayable content item. A content item may be any form of content (such as video content, audio content, text content, or the like), and content metadata may be information about and related to the content item, such as a title of the content item, individuals and organizations associated with the content (performers, authors, companies, or the like), or another content item where more information may be found.

Different content metadata may be correlated to discrete points in time in the content item as the content item is displayed. For example, at a first point in time a first product may be displayed, and at a second point in time a second product may be displayed. A device that requests content metadata about the first point in time may receive metadata related to the first product, and a device that requests content metadata about the second point in time may receive metadata related to the second product. Another example may be information about a first actor appearing the first point in time, and information about a location or event appearing at the second point in time. The content metadata may be displayed in an interactive application, such as a web browser. The content metadata may provide the user with more information about the content item or persons, places, or things being displayed in the content item. In some embodiments, the interactive application may be a social media application, providing a user a potential opportunity to comment on the content item generally, or a more specific portion of the content item.

For example, aspects of the disclosure may relate to inserting, by a computing device, one or more indicators into a content item and correlating each of the one or more indicators with metadata relating to the content item. A method may comprise receiving an identifier of a particular indicator from the one or more indicators, and determining, based on the received identifier, the metadata correlated to the particular indicator from the one or more indicators. A method may comprise transmitting to the other device the metadata correlated to the particular indicator.

The content item may comprise a first advertisement, and the metadata may comprise a second advertisement related to the first advertisement. The first advertisement may be formatted in a first format and the second advertisement may be formatted in a second format.

A method may comprise determining that a second computing device has switched from a first mode of operation to a second mode of operation. The first mode of operation may comprise playback of the content item, and the second mode of operation may comprise instantiation of a social media application or a web browser application.

Additionally or alternatively, aspects of the disclosure may relate to methods and systems for outputting, by a computing device, a content item for display and receiving a trigger indicating that an interactive application is to be displayed. A method may comprise determining a particular indicator from the one or more indicators associated with the content item, based on a timing associated with the trigger. A method may comprise transmitting, by the computing device, an identifier associated the particular indicator.

The interactive application may comprise a social media application, and a method may comprise outputting received metadata for display in one or more fields of the social media application. The interactive application may comprise a web browser application, and a method may comprise outputting received metadata for display in one or more fields of the web browser application.

Additionally or alternatively, aspects of the disclosure may relate to receiving a request for metadata from a requesting device, the request for metadata comprising an identifier associated with an indicator from a plurality of indicators associated with a content item; determining metadata related to the content item and correlated to the indicator; and transmitting the determined metadata to a user device different from the requesting device.

The method may comprise determining a portion of the metadata to be replaced and replacing the portion of the metadata.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIGS. 4A-4C illustrate an example set of timestamp indicators and example correlations between timestamp indicators and content metadata.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
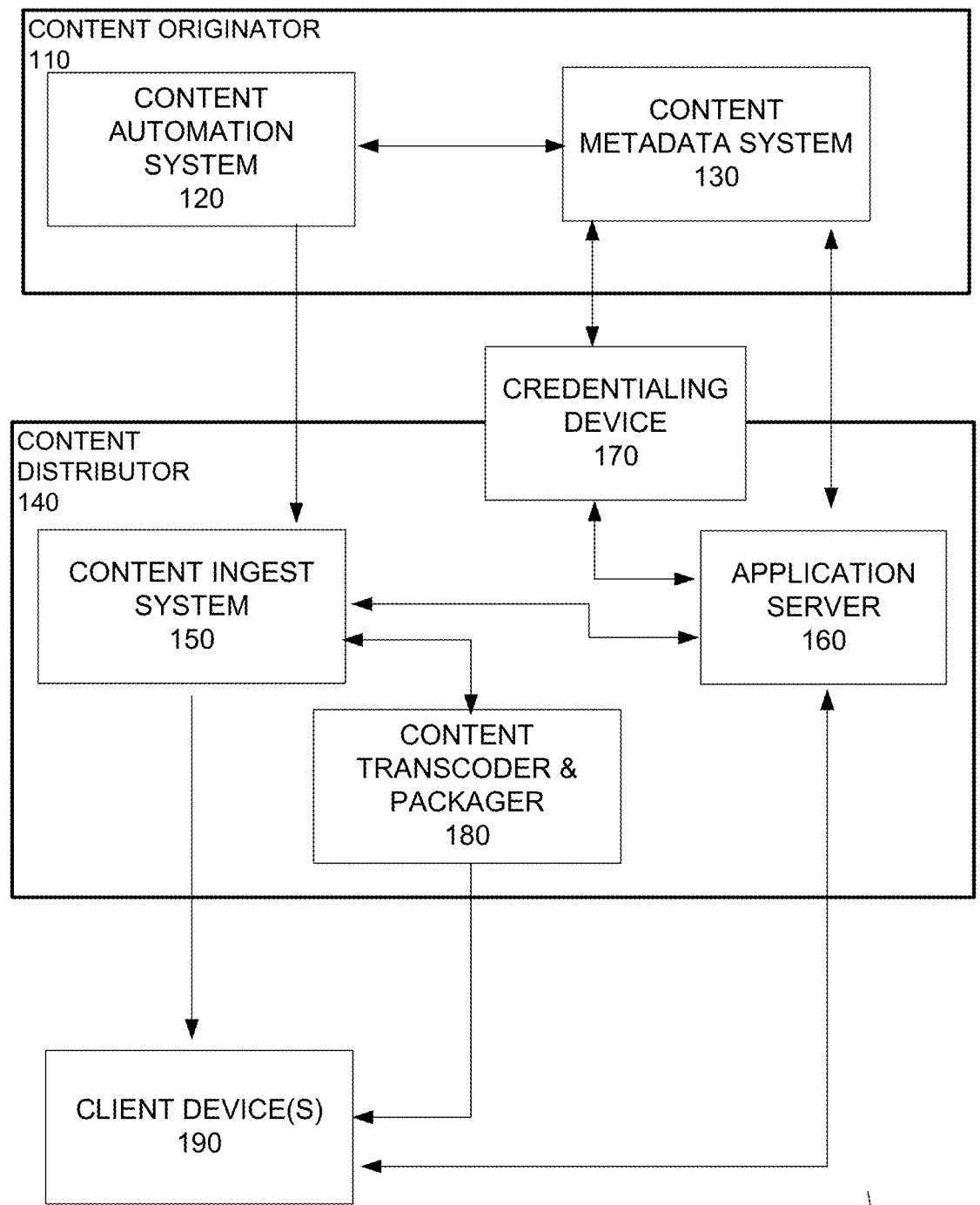
FIG. 1 illustrates an example system for providing content items and/or correlated content metadata.

FIG. 1 illustrates an example information distribution environment 100 in which many of the various features described herein may be implemented. A content originator 110 may serve as a source of content. The content may be audio, video, text, and/or interactive in nature, and may be from a live feed or previously recorded.

The content originator 110 may be responsible for operating a content automation system 120. The content automation system 120 may be responsible for transmitting content over one or more communication links. The content automation system 120 may be implemented among any one or more computer hardware, software, and/or firmware devices comprising a content playout system. In some arrangements, the content automation system 120 may comprise a broadcast automation system, which may be operating in a non-interactive mode without a human operator. In other arrangements, the content automation system 120 may comprise a user interface application, system and/or device for a user to direct and/or control when one or more operations of the content automation system 120 are to be performed.

The content automation system 120 may be responsible for receiving and/or transmitting content from other sources not illustrated in FIG. 1, including local and/or remote servers, workstations, hard drives, databases and the like. Additionally or alternatively, the content automation system 120 may be responsible for transmitting live content from one or more sources local to the content automation system (for example, cameras, microphones, and the like) and/or via a connection to one or more remote sources not shown in FIG. 1. This connection may be, for example, over satellite, cable, fiber-optic, radio, and the like.

The content automation system 120 may be responsible for switching between content items. Content items may be, as examples, news, sports, entertainment, educational programming, advertising, promotional identifiers, station identifiers, source identifiers (e.g., stings, teasers, trailers, bumpers), or the like. The switched-to content item may be from a different source than the switched-from content item. In some arrangements, the content automation system 120 may be responsible for switching between content items, for example, to transmit an advertisement, to transmit an alternative content item when the switched-from content item cannot be transmitted, to transmit emergency information, when the switched-from content item, or a portion thereof, terminates or ends, or the like. Playback and stoppage of the switched-to and switched-from content items may be initiated upon a signal from one or more devices of the content automation system 120. The content automation system 120 may switch back to the switched-from content item, if and when appropriate.

One or more devices of the content automation system 120 may be responsible for generating, inserting, and/or associating a timestamp indicator in the content transmitted over the one or more communication links. The timestamp indicator may be inserted in one or more locations of the content item (e.g., video channels, audio channels, data channels, packets, or the like) and/or another content item, content file, content stream, or the like. The location of the timestamp indicator may depend on the communication links, content formats, and/or delivery mechanisms used by the information distribution environment 100. In some embodiments, a timestamp indicator may not be displayed or communicated to a viewer of the content item. The insertion and/or association of a timestamp indicator may be automatic: for example, a timestamp indicator may be inserted into the content item at fixed intervals in the duration of the content (for example, every n seconds), or where the content automation system 120 has switched from a first content item to a second content item (for example, where the content automation system 120 has switched from an entertainment content item to an advertisement content item), or the like. Additionally or alternatively, a timestamp indicator may associated with user-defined points in a content item: for example, at a point believed to likely elicit an emotional response from a viewer of the content item, at a point in an advertisement where a new product or service is to be revealed, or the like. Further discussion of the timestamp indicator will be presented in connection with FIG. 4.

Also present in the system of FIG. 1 is a content metadata system 130. The content metadata system 130 may operate to store data related to the content transmitted as a result of the operation of the content automation system 120. In some embodiments, the content metadata system 130 may include one or more hardware, software, and/or firmware data storage devices, data structures, databases, and the like. This content related data (or content metadata) may be stored in one or more human and/or computer-readable formats. Content metadata may comprise, for example, the one or more timestamp indicators generated, associated, and/or inserted by one or more devices and/or systems operated by the content originator 110. Content metadata may also comprise, for example, information related to the content item generally, and information about the points of the content item at which the one or more timestamp indicators were inserted. This related content metadata information may comprise, for example, the title of the content item, individuals and organizations related to the content item (e.g., actors, athletes, companies, manufacturers, directors, composers, publishers, authors, or the like), locations related to the content item (e.g., set location, stadium, physical or virtual retail locations), product information (e.g., cost, availability, quantity, brand names) social and/or interactive media information (e.g., usernames, handles, e-mail addresses, telephone numbers, websites), or any other information.

The content metadata system 130 may be responsible for receiving data from one or more sources, including for example the content automation system 110 discussed above. Other sources may include, for example, other content originators and/or content distributors, one or more content distribution networks, third parties such as closed captioning firms, and the like. The content metadata system 130 may be responsible for transmitting or otherwise delivering data, including content metadata, to one or more other devices and/or systems of the information distribution environment 100, including an application server 160, directly and/or via a credentialing device 170, and/or the client devices 190.

A content distributor 140 may act as an intermediary between one or more content originators 110 and/or content consumers (whether devices and/or users). As an example, the content originator 110 may be a television network, and a content distributor 140 may be an information distribution provider that offers the television network to its subscribers and/or users.

In some arrangements, a content distributor 140 may assume some or all of the functions of one or more content originators 110, and operate a content automation system 120 and/or a content metadata system 130. The content distributor's operation of a content automation system 120 and/or a content metadata system 130 may be either in addition to a content originator 110 or in the alternative from a content originator 110. For example, in some arrangements the content originator 110 may only provide content distributors 140 a feed (e.g., a linear feed), such as in a closed-circuit television arrangement. Insertion of advertisements, for example, may be performed at any point by the content distributor 140 via a content automation system 120 maintained by the content distributor 140, either independently of the content originator 110 and/or on behalf of the content originator 110.

Additionally or alternatively, content may originate from a content source where operation of the content automation system 120 and/or content metadata system 130 by the content originator 110 may be infeasible or otherwise impracticable. For example, a content originator 110 may provide one or more copies of content to be distributed by the content distributor 140 in a content-on-demand arrangement (e.g. video-on-demand, music-on-demand, and the like.) In such an arrangement, a content automation system 120 may not be operated by the content originator 110, as there may not be an ongoing transmission from the content originator 110 to the content distributor 140. Nonetheless, the content originator 110 may operate a content metadata system 130 storing content metadata.

As another example, content may be inserted and/or switched into a regional or national broadcast feed both by one or more content automation systems 120 maintained by the content originator 110 and/or one or more content automation systems 120 maintained by the content distributor 140. For example, the content originator 110 may be responsible for inserting and/or switching to content that is national in geographic scope, and the content distributor 140 may be responsible for inserting and/or switching to content that is regional in geographic scope. Operation of a content metadata system 130 by the content distributor 140 may be independent from a content metadata system 130 maintained by the content originator 110, and/or may be in collaboration with the content originator 110. Content metadata related to such inserted and/or switched into content may therefore be generated and/or stored in the content metadata system 130 either by the content originator 110 and/or by the content distributor 140. The content metadata generated and/or stored by the content distributor 140 may include, for example, a timestamp indicator generated by one or more devices and/or systems operated by the content distributor 140. The timestamp indicator generated by one or more devices and/or systems operated by the content distributor 140 may be in the same or different manner and/or form as a timestamp indicator generated and/or included by one or more devices and/or systems operated by the content originator 110. In some embodiments, the content originator 110 and the content distributor 140 may both associate a timestamp indicator with the same point in the content.

The content distributor 140 may also operate one or more devices and/or systems, including, in some arrangements, the content ingest system 150. The content ingest system 150 may receive one or more transmissions (such as feeds) from one or more content originators, such as the content originator 110, and/or other sources. The content ingest system 150 may be responsible for unpacking, repacking, formatting, reformatting, transcoding and/or preparing the content received from the content originator 110 for distribution via one or more of the communication links operated by the content originator. This may comprise, for example, formatting the received content for distribution via a content over internet protocol (IP) network and/or formatting the received content for distribution via an coaxial network. In some embodiments, the content ingest system may communicate with a content transcoding and packaging device 180. In some embodiments, the content ingest system 150 may comprise a content automation system 120 and/or a content metadata system 130.

The content distributor 140 and/or the content originator 110 may operate one or more application servers, including an application server 160. The application server 160 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, the application server 160 may be responsible for collecting requests for metadata from the client devices and parsing those requests for fulfillment by metadata stored in the content metadata system 130. The application server 160 may be responsible for generating, formatting, and/or repackaging metadata, including content metadata from the content metadata system 130, for transmission to the client devices. The application server 160 may perform multiple functions (e.g., a combination of one or more of the above-described functions), or each of a plurality of application servers 160 may be each dedicated to one function.

Either the content originator 110 and/or the content distributor 140 may operate one or more credentialing devices 170. A credentialing device 170 may be responsible for encrypting, encapsulating, obfuscating and/or securing the communication between the content metadata system 130 and the one or more application servers 160. In some embodiments, all or a portion of the communication between the content metadata system 130 and the application server 160 may pass through the one or more credentialing devices 170. In some embodiments, the one or more credentialing devices 170 may issue keys, passwords, passphrases, and/or security associations to the content metadata system 130 and/or the one or more application servers 160 for direct and/or indirect communication between the content metadata system 130 and/or the one or more application servers 160. The one or more credentialing devices 170 may be responsible for shielding information communicated between the content metadata system 130 and/or the application servers 160 from unauthorized viewing, and/or protect against unauthorized requests for information from the content metadata system 130, for example by a malicious user and/or program seeking to scrape data from the content metadata system 130.

The client devices 190 may be computing devices that communicate with one or more devices and/or systems operated by the content distributor 140. For example, the client devices 190 may be televisions, personal computers, laptop computers, wireless devices (wireless laptops and netbooks, mobile phones, mobile televisions, personal digital assistants (PDAs), or the like), set-top boxes (STB), digital video recorders (DVR), computer servers, or any other desired computing devices. The client devices 190 may be responsible for displaying content obtained from the content originator 110 and/or the content distributor 140, locally and/or via an attached display. The client devices may be responsible for displaying other content, which may not be obtained from the content originator 110 and/or the content distributor 140. In some embodiments, the client devices may be responsible to display content, in the context of an interactive application.

Examples of interactive applications may include social media applications (e.g. any application where a user may create a text, audio, and/or video message and may transmit or otherwise make available that message to one or more other users) and/or an interactive World Wide Web browser. The client devices 190 may be responsible to receive any signal from the user that one or more interactive applications are to be displayed. The signal may be any entered using any form of human-computer interaction, including, for example, a signal entered via a wired or wireless interface device (e.g., keyboard, mouse, remote control), entered via another wired or wireless computing device (e.g., personal computer, laptop computer, mobile phone), or the like.

The client devices 190 may be responsible for locally storing content items and/or content metadata. This may comprise locally storing timestamp indicators included in content items. In some embodiments, it may be efficient to transmit metadata information related to a content item as part of the content item transmitted to the client devices. This may be, for example, where the encoding mechanism for the content item has unused and/or reserved fields for metadata. Additionally or alternatively, it may be efficient to transmit some metadata information related to a content item to the client device via another communication protocol, method, frequency, or the like than the content item. This locally-stored content metadata may be the same, similar to, and/or different from the content metadata stored by and/or accessible to the content metadata system.

Figure 2:
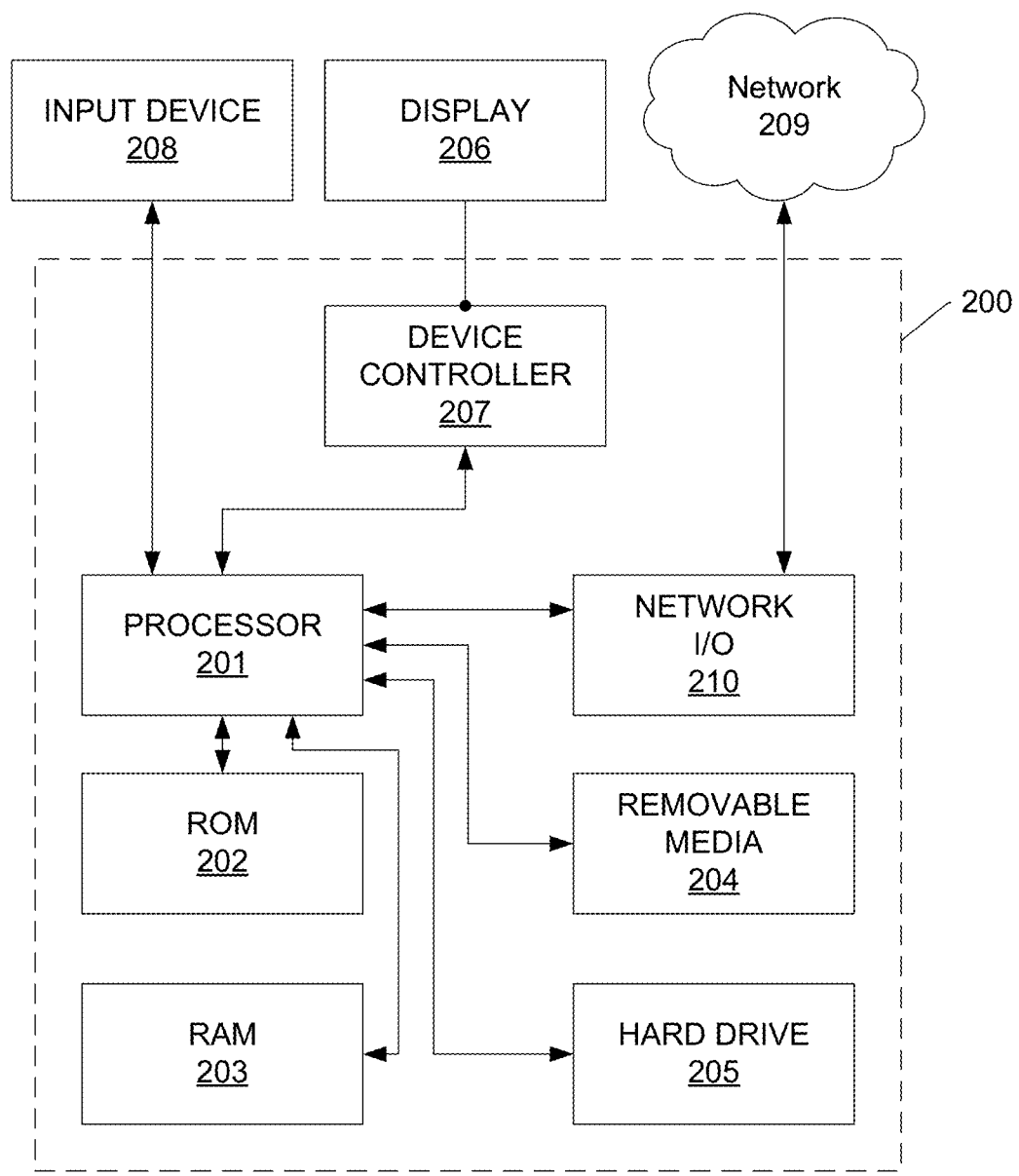
FIG. 2 illustrates example software and hardware devices on which various elements described herein can be implemented

FIG. 2 illustrates general hardware elements and software elements that can be used to implement any of the various computing devices and/or software discussed herein, including those of the adaptive streaming environment 100. The device 200 may include one or more processors 201, which may execute instructions of a computer program to perform any of the functions and steps described herein. The instructions may be stored in any type of non-transitory computer-readable medium or memory to configure the operation of the one or more processors 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in a hard drive 205, which may be an internal or external hard drive.

The device 200 may include one or more output devices, such as a display 206 (e.g., an external monitor or television), and may include one or more output device controllers 207, such as a video processor. In some embodiments, the device 200 may include one or more user input devices 208, such as a remote control, keyboard, mouse, touch screen, microphone, or any other input device.

The device 200 may also include one or more network interfaces, such as a network input/output (I/O) interface 210 to communicate with one or more networks 209. The one or more networks 209 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks. The network interface may be a wired interface, wireless interface, or a combination of the two. In some embodiments, the network I/O interface 210 may include a cable modem, and the one or more networks 209 may include the communication links 301 shown in FIG. 3, one or more external networks, an in-home network, a provider's wireless, coaxial, fiber, or hybrid fiber/coaxial distribution system (e.g., a DOCSIS network), or any other desired network.

Figure 3:
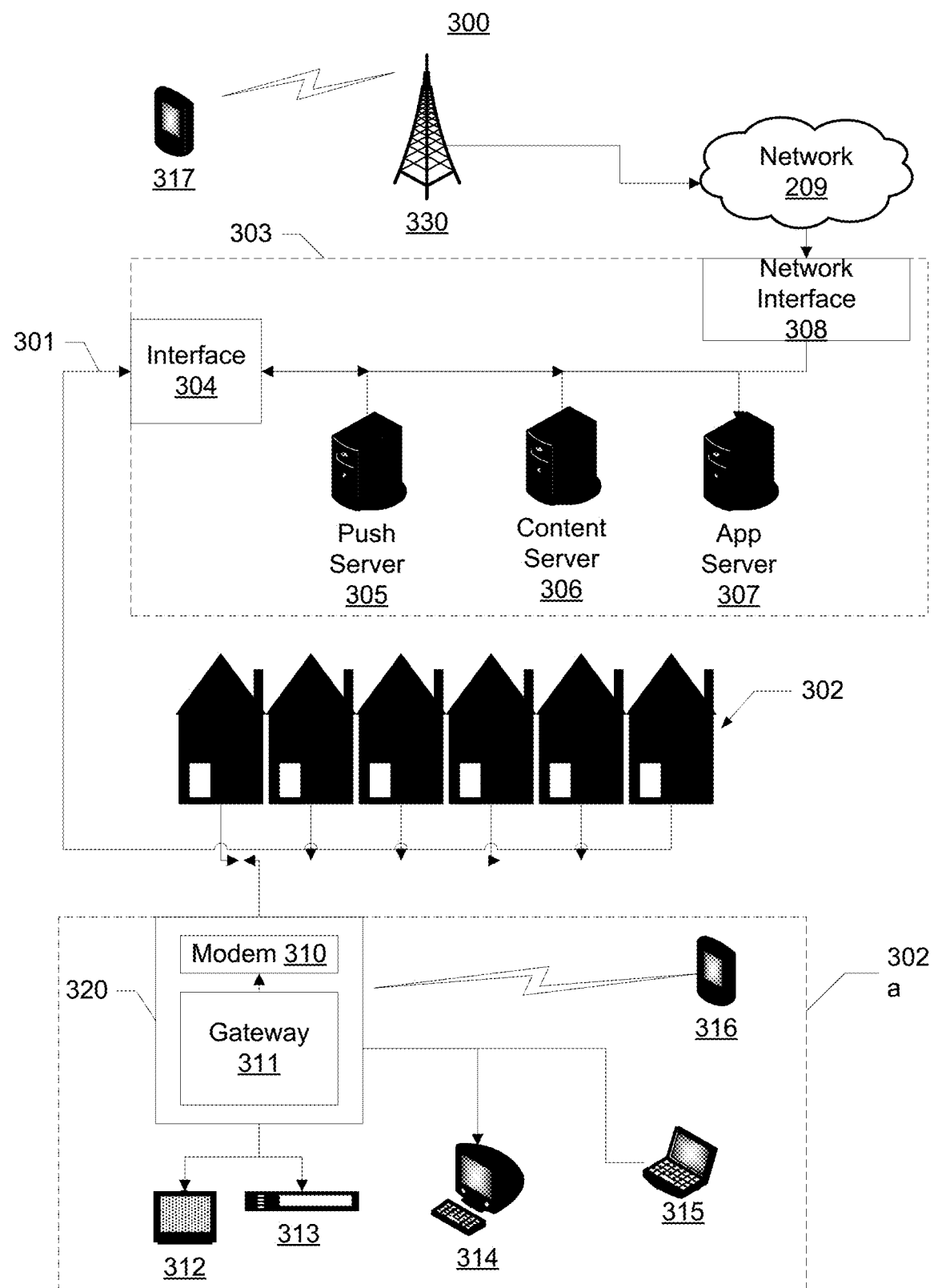
FIG. 3 illustrates an example network environment.

FIG. 3 illustrates an example information network 300 in which many of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

The network 300 may comprise a telecommunications network, a multi-service operator (MSO) network, a cable television (CATV) network, a cellular network, a wireless network, an optical fiber network, a coaxial cable network, a hybrid fiber-coaxial (HFC) network, or any other type of information distribution network or combination of networks. For example, the network 300 may comprise a cellular broadband network communicating with multiple communication access points, such as a wireless communication tower 330, to provide communication signals to devices such as a wireless device 317 (e.g., a mobile phone, a wireless laptop, a tablet computer, a portable gaming device). In another example, the network 300 may be a coaxial system comprising a modem termination system (e.g., a cable mode termination system (CMTS)) communicating with numerous gateway interface devices (e.g., a gateway interface device 311 in an example home 302*a*). The network 300 may use a series of interconnected communication links 301 (e.g., coaxial cables, optical fibers, wireless links, or the like) to connect premises such as a plurality of homes 302 or other user environments to a local office 303.

The local office 303 may include an interface 304, which may be a computing device configured to manage communications between devices on the network of communication links 301 and backend devices, such as a push servers 305, content servers 306, and application servers 307. The local office 303 may include one or more network interfaces 308 for communicating with one or more networks 209.

The local office 303 may include a variety of servers that may be configured to perform various functions. The local office 303 may include one or more push servers 305 for generating push notifications to deliver data to devices that are configured to detect such notifications. The local office 303 may include one or more content servers 306 configured to provide content to devices. The local office 303 may include one or more application servers 307, which may be used, in some instances, to implement the content distributor 140. The local office 303 may be communicatively coupled to the device 200 through one or more networks 209. In other embodiments, the local office 303 may be communicatively coupled to and the device 200 through the one or more networks 209.

Homes 302 such as the example home 302*a* may include an interface 320, which may include a device 310, for communicating on the communication links 301 with the local office 303, the one or more networks 209, or both. In certain implementations, the device 310 may be a part of, or communicatively coupled to, a gateway 311 (e.g., a gateway interface device, a wireless router, a set-top box, a computer server).

The gateway 311 may include local network interfaces to provide communication signals to client devices in or near the example home 302a, such as a television 312, a set-top box 313, a personal computer 314, a laptop computer 315, a wireless device 316 (e.g., a wireless laptop, a tablet computer, a mobile phone, a portable gaming device), a vehicular computing system (e.g., a mobile computing system, navigation system, or entertainment system in an automobile, marine vessel, or aircraft) and/or any other device.

Figure 4A:
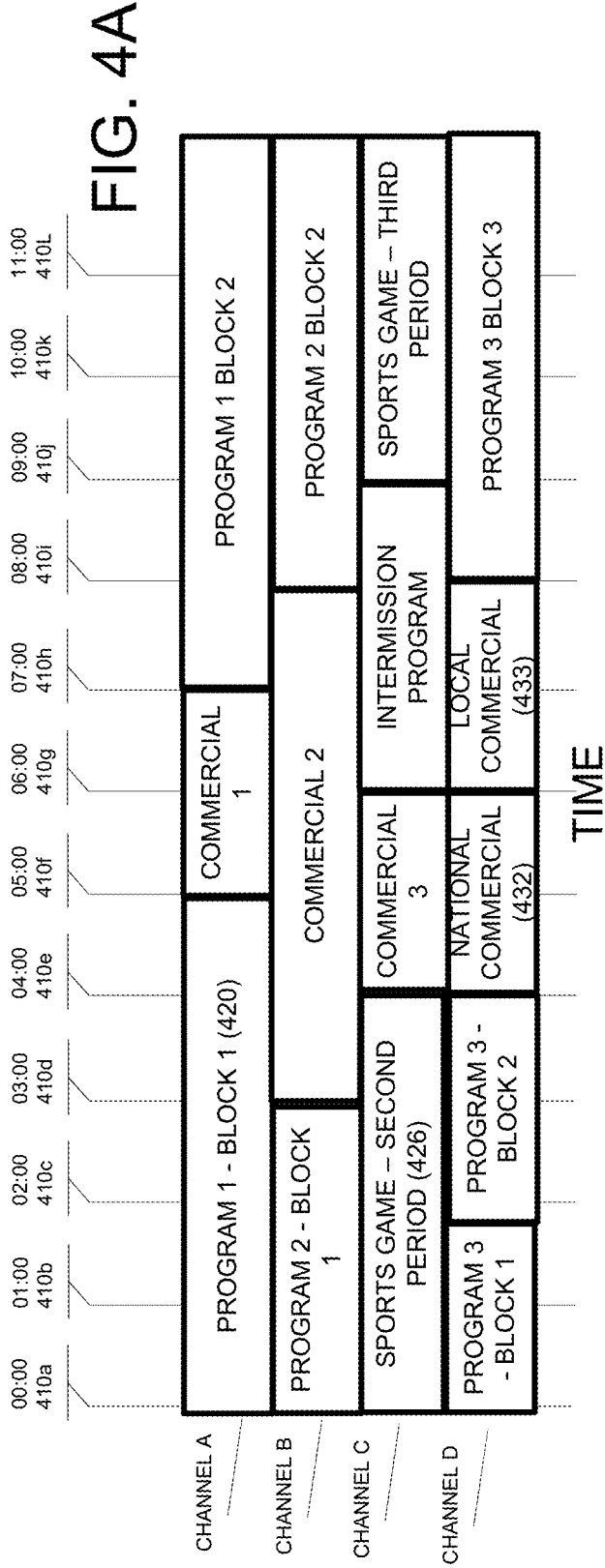
Figure 4B:
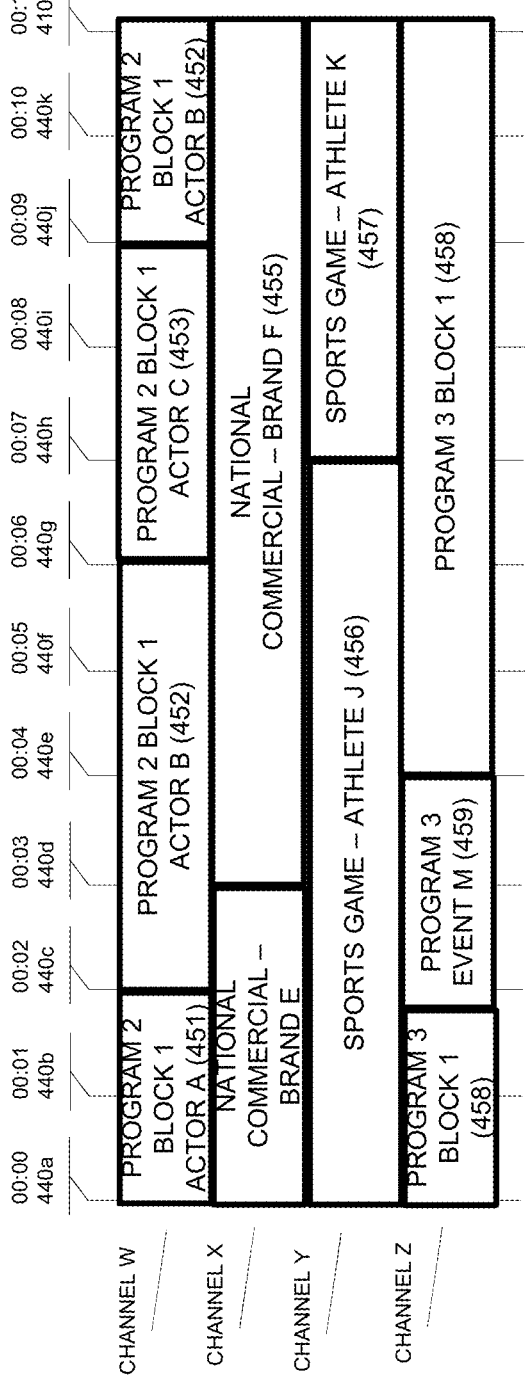

As discussed above in connection with FIG. 1, one or more devices and/or systems of the content originator 110 and/or the content distributor 140 may be responsible for generating, inserting, associating, and/or including a timestamp indicator in an item of content, content stream, content program, content file, or the like. The timestamp indicators may be correlated with content metadata information related to the content items at the time points associated with the timestamp indicators. FIGS. 4A and 4B illustrate example timestamp indicators which may be used in some embodiments of the present disclosure. FIG. 4C illustrates an example correlation between the example timestamp indicators of FIGS. 4A and 4B and content metadata information.

As shown in FIG. 4A, timestamp indicators may be associated with fixed durational intervals of one or more content items. For illustrative purposes, the time scale of FIG. 4A may be minutes. Content distributed by a content distributor 140 may be presented on one or more channels, such as Channel A, Channel B, Channel C, and Channel D. In some embodiments, these may be digital subchannels that may have been multiplexed by a content originator into a single channel, and may have been demultiplexed by one or more devices and/or systems of the content distributor. In some embodiments, Channels A, B, C, and D may be from one or more content originators. One or more timestamp indicators may be inserted into the content items presented on Channels A, B, C, and D at one or more of the points 410a-410L by either the content originator(s) and/or the content distributor. Although FIG. 4A depicts the timestamp indicator may be associated with fixed intervals across channels, in some embodiments, one or more content providers may have timestamp indicators associated with time intervals (fixed or irregular) different from the timestamp indicators of another one or more content providers.

As may be seen in FIG. 4A, timestamp indicators may be used to determine a content item and/or a portion of a content item. For example, a timestamp indicator associated with point 410c into the content presented on Channel A may be inserted into Program 1— Block 1 420. As discussed above, timestamp indicators may be inserted into a content item by either the content originator 110 and/or the content distributor 140. For example, a timestamp indicator associated with point 410c into the content item presented on Channel C may be inserted by the content originator into the second period of a live sports game 426. A timestamp indicator associated with point 410h into the content item presented on Channel D may be inserted by the content distributor, for example, into a commercial of local origination 433.

As FIG. 4B shows, in some embodiments greater granularity of timestamp indicators inserted into content items may be used. Whereas the time-scale of FIG. 4A may be in minutes, the time-scale of FIG. 4B may be seconds. In other embodiments, timestamp indicators may be created at other regular or irregular intervals. One or more timestamp indicators may be inserted into the content items presented on Channels W, X, Y, and Z associated with one or more of the points 440a-440L by either the content originator(s) and/or the content distributor. For example, in some arrangements the content originator of content presented on Channel Y may not associate a timestamp indicator with every second. Although FIG. 4B depicts the timestamp indicator may be occurring at fixed intervals across channels, in some embodiments, one or more channels may have inserted timestamp indicators at fixed or irregular intervals different from the inserted timestamp indicators of another one or more channels.

As described above, timestamp indicators may be inserted into content items based on additional or alternative criteria. For example, in the content item Program 2— Block 1 451-453 presented on Channel W, timestamp indicators may be inserted based on which actor is speaking, appearing on-screen, holding an object, performing an action, or the like. In some embodiments, the content originator 110 and/or the content distributor 140 may insert a timestamp indicator into the content item associated with the fixed intervals of points 440. In some embodiments, however, the content originator 110 and/or content distributor 140 may insert timestamp indicators associated with points where the actor has changed; for example, at a first point 440c, second point 440g, and/or third point 440j. Timestamp indicators may also refer to other points in time and/or other timestamp indicators that have already proceeded or are forthcoming. For example, the content originator of the content item 451-453 presented on Channel W may insert timestamp indicators that refer to the point where an actor appearing on-screen last changed and/or where the actor appearing on-screen will next change. For example, a timestamp indicator associated with a point 440h may refer to the change from Actor B (452) to Actor C (453) at a past point 440g and/or the change from Actor C (453) back to Actor B (452) at a future point 440k.

Additionally or alternatively, timestamp indicators may be inserted into content items based on criteria such as the brand name of item appearing on screen. For example, timestamp indicators may be associated with one or more points 440d-440l that may be correlated with content metadata information related to Brand F 455. As illustrated in the row for Channel Y, timestamp indicators may be associated with athletes completing in live and/or taped sports programs 456-457. For example, athlete J may be presented in the content item 456 presented on Channel Y between time points 440a-440h. At time point 440h, athlete K may instead be presented in the content item 457.

Additionally or alternatively, in some arrangements, content may be segmented based on an occurrence of a notable event within the program, as illustrated in the row for Channel Z. For example, Event M 459 may be an important event in the program 458-459, such as the appearance of a guest star, death of a character, "reveal" of a plot-twist, elimination of a contestant, humorous or tragic moment, or the like. In other arrangements, such as where program 3 is a sports program, event M may be a change in score, a notable play, a foul committed by a player, a controversial call, an injury to a participant, or the like.

As discussed above, a timestamp indicator may be correlated with content metadata information related to the content. The correlation and/or the correlated information may be stored in the content metadata system 130. The content metadata information may be retrieved or transmitted from the content metadata system 130 based on the timestamp indicator. FIG. 4C illustrates example correlations between some of the timestamp indicators appearing in the examples of FIGS. 4A and 4B and related content metadata information.

For example, as seen in FIG. 4B, a commercial 455 for brand F may be presented at a time point 440e on Channel X. A timestamp indicator 460 may be inserted into the content item presented on Channel X associated with the time point 440e. The timestamp indicator 460 may therefore be correlated with a content metadata 470 which may comprise company information for Brand F. As discussed above, the content metadata 470 may include manufacturer information, product information (e.g., cost, availability, quantity, brand names) social and/or interactive media information (e.g., usernames, handles, e-mail addresses, telephone numbers, websites), or any other information.

In some embodiments, the timestamp indicator may be correlated with a plurality of content metadata that is application specific. In other words, a plurality of content metadata may be stored and/or associated in the content metadata system 130 and correlated to one or more timestamp indicators. A subset of the plurality of content metadata may be retrieved based on an instantiation of an interactive application, such as a social media application and/or web browser, by a client device. Timestamp indicator 460 may correspond to content metadata information for specific use in a first application, which may be a social media application. Timestamp indicator 460 may additionally or alternatively correspond to content metadata information for specific use in a second application, which may be a web browser application.

The client device may receive a trigger, for example from a user, to instantiate either or both of a social media application and/or a web browser application. The client device may determine that the most recent timestamp indicator on the client device and/or via an attached display was timestamp indicator 460. The client device may transmit to the application server the timestamp indicator 460, and in some embodiments, may transmit to the application server an indication that either or both of a social media application and/or a web browser application is to be instantiated. The application server and/or the content metadata system may determine that content metadata information 480 specific to social media application and/or content metadata information 490 specific to the web browser application is to be delivered to the client device.

As another example, a plurality of timestamp indicators 465, 466, and 467 may be inserted into a national commercial content item 432 and may be associated with a plurality of time points 410e, 410f, and/or 410g. With reference to the time-scale of FIG. 4A, these may be at 0 seconds, 60 seconds, and 120 seconds into the national commercial content item 432. The client device may receive a trigger indicating instantiation of an interactive application, which may be the web browser application, during the presentation of the national commercial content item on the client device. The trigger may be, for example, a user requesting the instantiation of the web browser application, or the trigger may be a listening program, application, and/or device attached to the client device which may be configured to listen for one or more of the plurality of timestamp indicators 465, 466, and 467 and/or listen at one or more of the plurality of time points 410e, 410f, and/or 410g, and/or other like triggers.

The client device may transmit to the application server and/or the content metadata system an identifier of the timestamp indicator associated with the most recently presented point-in-time of the content item for which there is a timestamp indicator. For example, at 35 seconds into the content item, the most recently presented point in time associated with a timestamp indicator may be time point 410e (zero seconds into the national commercial content item), and the timestamp indicator associated with time point 410e may be timestamp indicator 465. At 62 seconds into the content item, the most recently presented point in time associated with a timestamp indicator may be time point 410f (sixty seconds into the national commercial content item), and the timestamp indicator associated with time point 410f may be timestamp indicator 466.

The content metadata system and/or the application server may deliver to the client device a newly-transmitted content item to be presented on the transmitting and/or instantiating client device, another client device (such as a laptop device, mobile device, and/or another device on the same network and/or associated with the same user at the transmitting and/or instantiating client device), and/or a display device attached to the client device. The newly-transmitted content item may portray content the same as, similar to, or different from the content of the national commercial content item 432. For example, the newly-transmitted content item may be the same content, but may be formatted for presentation in the web browser application. In some embodiments, the newly-transmitted content item may comprise more detailed information regarding the national commercial content item, which may be more relevant to the user and/or client device. For example, the newly-transmitted content item may contain a detailed description of specific features of the product and/or service. In some embodiments, the more detailed information may be further determined and/or included by the application server and/or the content metadata system based on other knowledge of the user and/or the client device, such as the location of the user and/or client device, user preferences, client device system settings, historical information, personal information, or the like. For example, the application server and/or content metadata system may include in the newly-transmitted content item the closest retail location to the user and/or client device that may stock a product portrayed in the national commercial content (and/or the newly-transmitted content item, in some embodiments where the products portrayed may differ).

A timestamp indicator may be correlated with a plurality of events, actors, and/or athletes appearing on screen. For example, timestamp indicator 460 may be correlated with a commercial such as the commercial 455, which may be a national commercial for brand F. Within the national commercial for brand F, a famous actor X may appear for a time to promote brand F. Timestamp indicator 468 may be correlated with famous actor X.

Either or both of the timestamp indicators 460 and 468 may be inserted into the content item commercial 455 and associated with point 440e. As another example, two characters may be onscreen simultaneously, for example in an action fight scene, and the timestamp indicator may correspond with either or both characters. As a further example, athlete L may have been involved in event M.

In some arrangements, where a timestamp indicator corresponds to multiple on-display events, actors, athletes, or the like, the interactive application, application server, and/or content metadata system may select a subset of the content metadata information from the plurality of corresponding content metadata information. This selection may be based on, for example, a preference of the content originator and/or content distributor (e.g., prefer content metadata information for advertisers over actors) or a preference set by the user on the client device (e.g., prefer information for athletes of Team 1 over athletes of Team 2). Additionally and/or alternatively, selecting from among the available information may be based on the interactive application triggered on the client device. For example, if the instantiating application is a social media application, the client device, application server, and/or content metadata system may prefer program event information. If the instantiating application is a web browser application, the client device, application server, and/or content metadata system may prefer advertiser information.

In some arrangements, a client device may transmit an identifier associated with the most recent timestamp indicator. In other arrangements, the identifier may be associated with another timestamp indicator (e.g., first timestamp indicator, last timestamp indicator) inserted in the content item. For example, the client device may be configured to transmit an identifier associated with a noteworthy event, such as Event M, (or the timestamp indicator associated with the noteworthy event) even after a last point in time Event M appears in the duration of the content item. For example, the client device may be configured to transmit an identifier associated with timestamp indicator 463, which may have been associated with time point 440*d* in the content item displayed on Channel Z, at any point after time point 440*d*. This configuration may be based on a device setting of the client device, information within the timestamp indicator and/or information within the content item. For example, the timestamp indicator 440*d* may be marked as a "special event" timestamp indicator by either attribute and/or form.

Additionally or alternatively, the content metadata system and/or application server may be configured to return the Event M content metadata information correlated with timestamp indicator 463, if an identifier associated with a later timestamp indicator (e.g., timestamp indicator 464 associated with time point 440*f*) is transmitted by the client device to the application server and/or the content metadata system. As an example, the user may trigger instantiation of a social media application based on a desire to create a social media post regarding Event M. The user may have been delayed in triggering the instantiation of the social media application until after the last time point for which there is a timestamp indicator correlated with Event M content metadata information.

The client devices may be responsible for searching the local metadata storage for metadata correlated with a particular timestamp indicator as necessary. For example, the client device may be configured to search the local metadata storage prior to transmitting an identifier associated with the timestamp indicator to the application server. In some embodiments, timestamp indicators appearing in the content item may flag, notify, or otherwise indicate to the client device that metadata associated with the timestamp indicator may be locally stored. For example, a timestamp indicator 461 may have an attribute and/or a different form (e.g., a suffix of "-local") to indicate to the client device that there may be locally stored metadata.

In some embodiments, the client device may "pre-fetch" metadata. For example, where there is an upcoming noteworthy event in the content item currently being displayed by the client device, a second client device, and/or on a display connected to the client device, the client device may "pre-fetch" content metadata information correlated to the noteworthy event. This pre-fetching may be explicitly performed as the result of a timestamp indicator inserted into the content item by the content originator and/or content distributor. For example, the client device may be configured to receive content metadata information if a timestamp indicator appears in the content item having a certain attribute and/or form. In some embodiments, this pre-fetching may instead be performed on a scheduled basis as a result of a client device preference and/or system setting, user preference and/or setting, historical information and/or personal information or the like. For example, the content distributor may desire to ensure availability of the application server and/or the content metadata system by "load-balancing" requests from client devices. For example, the content distributor may instruct certain client devices to pre-fetch content metadata on a staggered basis (e.g., once every hour, with half of the instructed devices configured to fetch at the top of the hour, and the other half configured to fetch at the bottom of the hour). In some embodiments, pre-fetching may be done as the result of a predictive determination. For example, the client device, application server, and/or content metadata system may determine that the user opens an interactive application at regular intervals (e.g., to post to a social network or check on the progress of a sporting event every five minutes.) The client device may pre-fetch metadata related to the currently displayed content item in advance of the next time the user is likely to trigger instantiation of an interactive application. For example, the client device may transmit an identifier associated with the most recent timestamp indicator to the application server and/or the content metadata system.

Figure 5:
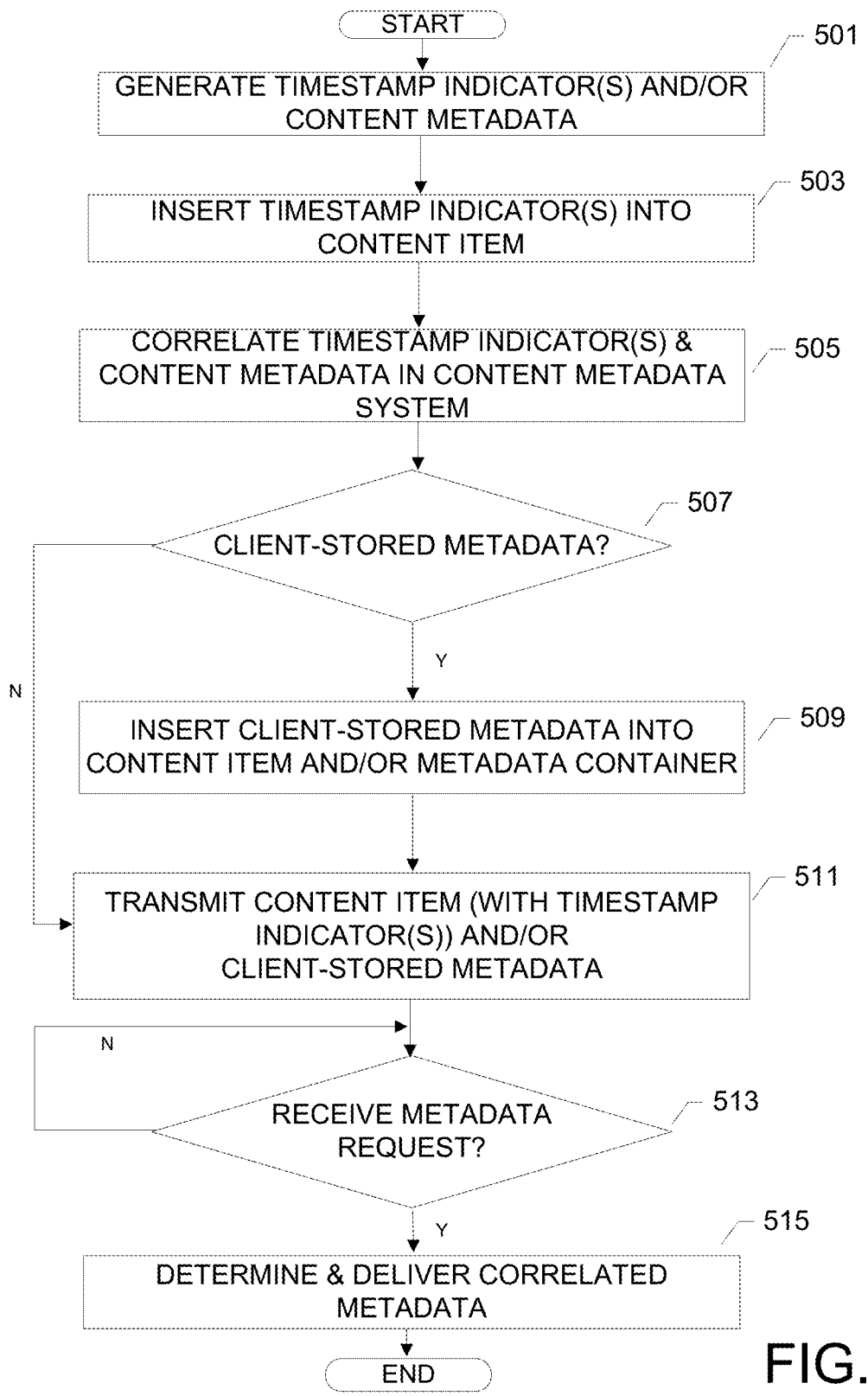
FIG. 5 illustrates an example process flow for generating a content item having one or more timestamp indicators and/or retrieving correlated content metadata.

FIG. 5 illustrates a method by which the content automation system and/or the content metadata system (operated either by the content originator and/or the content distributor) may generate and/or include timestamp indicators and/or content metadata in a content item. FIG. 5 also illustrates a method by which the content automation system and/or the content metadata system may deliver content metadata based on the transmission of a timestamp indicator. In step 501, a timestamp indicator and/or content metadata may be generated. In some embodiments, the content automation system and/or the content metadata system may be responsible for generation of the timestamp indicator; In some embodiments, an upstream content author may have previously generated, associated, and/or inserted timestamp indicators into the content item. For example, a production company responsible for delivering a completed content item may have already generated timestamp indicators into the content item for insertion into the content item by the content originator and/or content distributor. The content originator and/or content distributor may generate additional or alternative timestamp indicators in the content item.

In step 503, any generated and/or received-but-not-inserted timestamp indicators may be inserted into the content item and/or associated with the appropriate locations (e.g., points-in-time, noteworthy events, commencement points, termination points, or the like). This step may comprise automatically and/or manually inserting one or more timestamp indicators based on one or more attributes of the content item or the content portrayed therein (e.g., duration, language, actors, events, athletes, products, services, or the like). As discussed above, these timestamp indicators may have been generated by the content automation system, the content metadata system, and/or an upstream content author.

In step 505, content metadata may be correlated with the timestamp indicators. In some embodiments, this step may occur prior to insertion of the timestamp indicators into the content item (e.g., step 505 may occur prior to step 503). The results of the correlation may be stored in one or more content metadata systems.

As discussed above, in some embodiments content metadata may be transmitted for storage by the client device.

Such content metadata may be determined in step 507. In step 507 it may be determined that client-stored content metadata is to be inserted into the content item (YES branch), and the determined content metadata may be prepared for transmission at step 509. This client-stored content metadata may be inserted in the content item or may be packaged into a content metadata container for transmission to the client device directly or via the devices and/or systems of the content distributor 140. Otherwise, in step 507 it may be determined that there is no client-stored metadata to be inserted (NO branch), the system may immediately proceed to step 511.

In step 511, the content automation system and/or the content metadata system may transmit the content item and/or any client-stored content metadata to the client device using any of the communication methods, networks, and/or devices described above.

In step 513, the content automation system and/or the content metadata system may await the receipt of a timestamp indicator and/or metadata request. That is, step 513 may loop (NO branch) until an identifier associated with a timestamp indicator and/or metadata request is received (YES branch). Receipt of an identifier and/or a metadata request may signal that a client device is requesting content metadata that is correlated with the received timestamp indicator.

In step 515, after receipt of an identifier associated with a timestamp indicator and/or metadata request, the one or more content metadata systems (and/or the application server) may determine one or more pieces of content metadata and/or deliver the determined one or more pieces of content metadata to a destination, such as the application server and/or another device.

Figure 6:
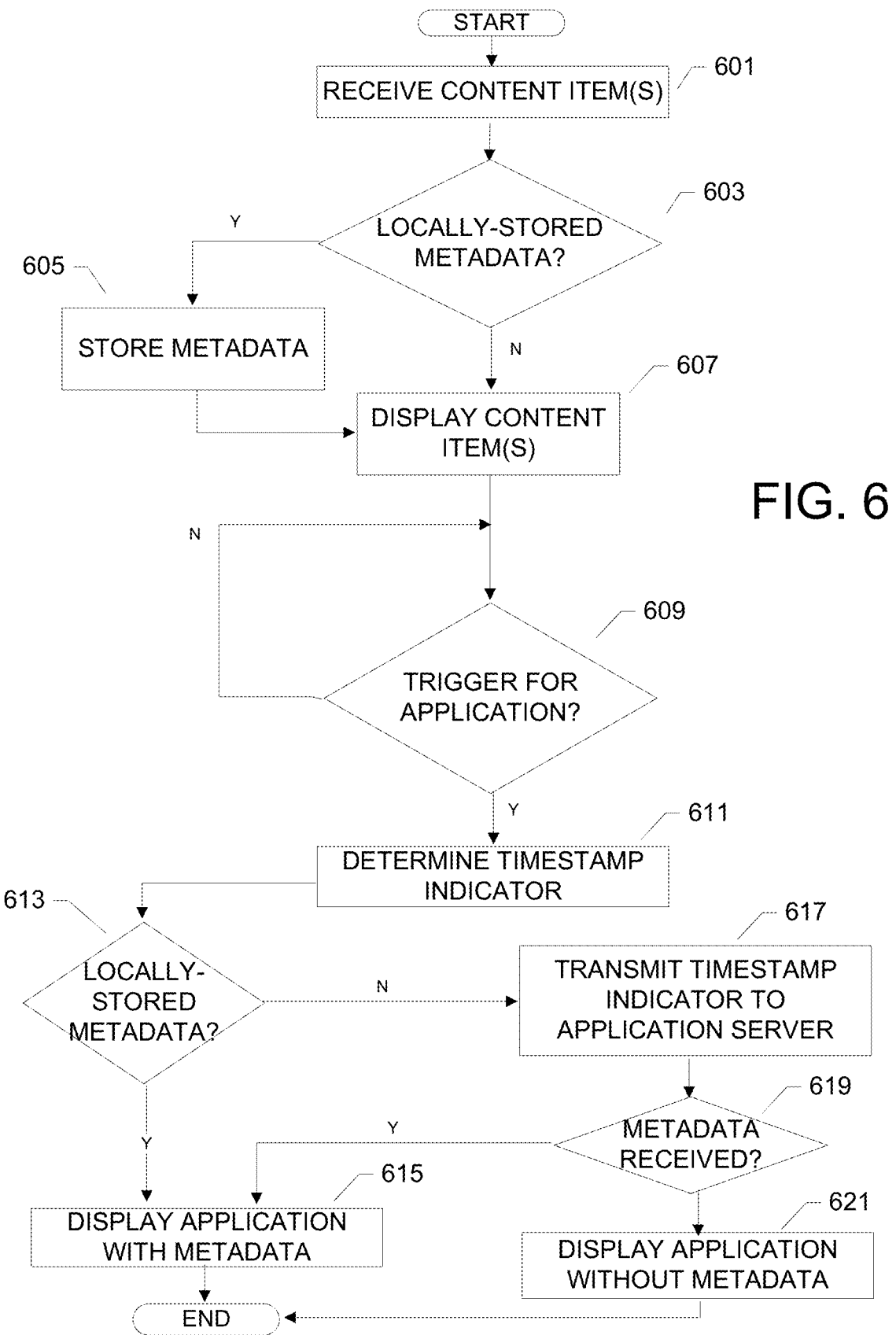
FIG. 6 illustrates an example process flow for acquiring and processing a content item having one or more associated timestamp indicators and/or receiving correlated content metadata.

FIG. 6 illustrates a method by which the client device may receive a content item having one or more timestamp indicators and by which the client device may receive content metadata correlating to one or more timestamp indicators. In step 601, the client device may receive one or more content items from, for example, the content distributor.

In step 603, the client device may determine whether the received content items contain content metadata to be stored locally at the client device. In some embodiments, the client device may receive the client-stored content metadata included in the content item, and/or the client device may receive the client-stored content metadata via a separate content metadata container. If the client device determines it has received content metadata (YES branch), the client device may store such client-stored metadata in step 605 prior to proceeding to step 607. Otherwise (NO branch), the client device may proceed immediately to step 607.

In step 607, the client device may display one or more content items. This may include display of the one or more content items on the client device itself, on another device attached to and/or connected with the client device wired or wirelessly. The client device may display one or more content items at the request of a user, and/or may display one or more content items independent from a user action.

In step 609, the client device may receive a trigger to instantiate and/or populate an interactive application with content metadata. This trigger may be the result of a user request (e.g., a user indicating via a device that the application is to be initiated), may be based on a predictive determination that content metadata may be retrieved, and/or as the explicit instruction of one or more devices, data structures, and/or systems (e.g., an instruction received from the content distributor, a timestamp indicator, or the like).

In step 611, the client device may determine one or more timestamp indicators inserted into and/or associated with the content item displayed. This may comprise determining the current position (e.g., time, image, frame, or the like) of the displayed content item. In some embodiments, a determined timestamp indicator may be the immediately previous timestamp indicator relative to the currently displayed time point in the content item. In some embodiments, a determined timestamp indicator may be the immediate next timestamp indicator relative to the currently displayed time point in the content item, one or more determined timestamp indicators may be one or more timestamp indicators associated with a noteworthy event previously presented relative to the currently displayed time point in the content item. In some embodiments, one or more determined timestamp indicators may be timestamp indicators associated with the most recent commercial advertisement displayed relative to the current position in the content item.

In step 613, the client device may further determine that at least one of the one or more timestamp indicators may be associated with content metadata locally-stored at the client device. If in step 613, the client device determines that there is locally-stored content metadata (YES branch), the client device may proceed to step 615 and prepare the locally-stored metadata for presentation on the same and/or a different device as the currently displayed content.

If in step 613, the client device determines that there is no locally-stored metadata (NO branch) or additional or alternative metadata is needed (for example, the locally-stored metadata is incomplete and/or outdated), then at step 617, the client device may transmit the timestamp indicators and/or a content metadata request including data representative of the timestamp indicators to the application server (and/or the content metadata system). The client device may await delivery of content metadata from the content metadata system and/or the application server at step 619. The client device may wait for a predetermined or user-set period of time, such as a timeout period.

If content metadata is received at step 619, the client device may deliver the received content metadata to the interactive application (e.g., social media application, web browser application, or the like) for further post-receipt processing (not shown) and/or display of the interactive application on one or more devices (e.g., at step 615).

If no content metadata is received by the client device (for example, because content metadata does not exist and/or is not retrievable), or there was an error condition such as a time-out) in step 619, then at step 621 the client device may display the interactive application without newly-received metadata. Displaying the application without newly-received metadata may comprise, for example, using previously-received metadata, generic metadata stored-locally, and/or not using metadata in the instantiation of the interactive application.

Figure 7:
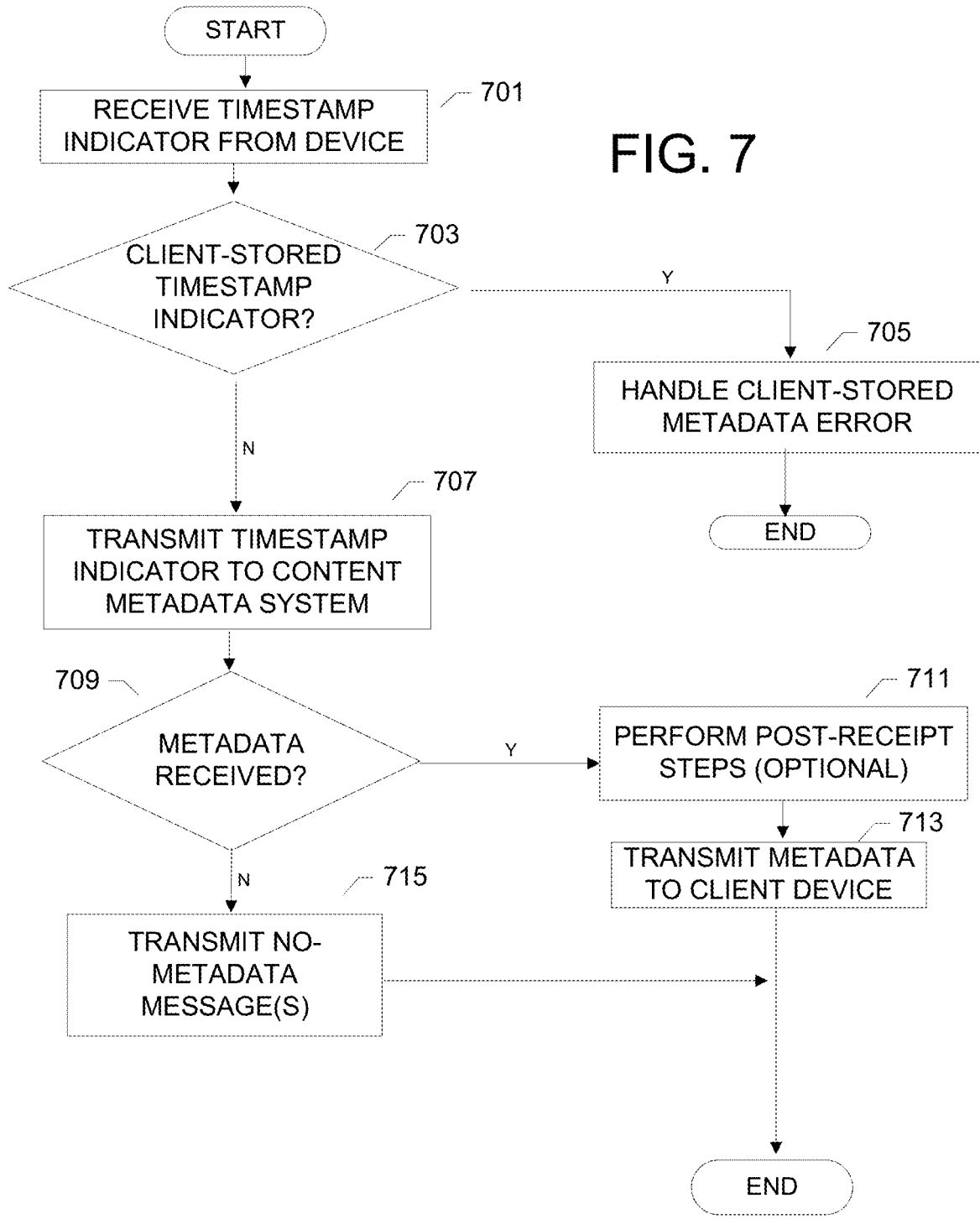
FIG. 7 illustrates an example process flow for receiving a timestamp indicator and/or delivering correlated content metadata.

FIG. 7 illustrates a method by which the application server may determine and transmit content metadata information to a device. In step 701, the application server may receive a timestamp indicator and/or content metadata request from a client device. In some embodiments, this timestamp indicator may be the result of the client device's determination that a trigger has been activated, for example, if the user of the client device has requested an interactive application, a predicted interval has elapsed, and/or the client has been explicitly instructed to transmit an identifier based on the timestamp indicator's attribute and/or appearance in a certain form.

In step 703, the application server may determine the type of timestamp indicator as necessary. This step may be omitted where, for example, one of the content distributor and/or content originators does not insert timestamp indicators in the content items transmitted to the client devices. Additionally or alternatively, this step may be omitted where locally-stored content metadata is not transmitted to the client device.

As discussed above, in some embodiments metadata to be stored locally at the client may be packaged in the content item and/or otherwise transmitted to the client. The client device may transmit a timestamp indicator correlated with client-stored metadata despite this packaging, for example where the client device has encountered an error, where the metadata has expired and/or been overwritten, or the like. The application server may be aware of this transmission of the metadata in the content item. Thus, as illustrated in step 705 if the client device transmits an identifier associated with a timestamp indicator that is associated with client-stored metadata (YES branch of 703), the application server may be responsible for handling such an identifier in one or more ways. For example, the application server may be configured to transmit (or retransmit) the client-stored metadata, transmit similar and/or different metadata, record the client device's failure to store and/or access the client-stored metadata, or the like.

In step 707, the application server transmits as appropriate an identifier associated with the timestamp indicator to one or more content metadata systems operated by the content originator, content distributor and/or third parties. For example, the identifier received by the application server may be associated with a content distributor timestamp indicator, and the application server may transmit the identifier and/or a different identifier to a content metadata system other than the content metadata system operated by the content originator. As another example, the identifier received by the application server may be associated with a content originator timestamp indicator, and the application server may transmit the identifier and/or a different identifier to a content metadata system operated by the content originator, and may additionally or alternatively transmit the identifier and/or a different identifier to the content metadata system of the content distributor and/or a third party. In some embodiments, the application server may have application logic and/or instructions to prefer content metadata from one or more content metadata systems, for example, by maintaining an ordered list of content metadata systems.

In step 709, content metadata may be received by the application server from one or more content metadata systems. In some embodiments, there may be no content metadata correlated to a timestamp indicator. For example, the correlated metadata may have expired or been overwritten, there may be an error in the timestamp indicator, the correlated content metadata may not yet be available, or the like. If no content metadata is received by the application server, the application server may in step 715 transmit one or more messages to other devices and/or systems notifying the other devices and/or systems that no content metadata exists. For example, the application server may transmit a no-content-metadata message to the requesting client device, which may indicate to the client device that an interactive application is to be presented without content metadata. As another example, the application server may transmit a no-content-metadata message to a reporting user, system, and/or device, which may indicate the necessity of further review.

If content metadata is received from the one or more content metadata systems, then in some embodiments, additional post-receipt steps may occur in step 711. For example, in some embodiments, a uniform resource indicator denoting an internet location and/or resource may be delivered to the application server. The application server may retrieve additional information from the internet location and/or resource prior to transmission to the client device. Another optional post-receipt step may be modification, insertion, and/or replacement of the content metadata delivered by the one or more content metadata systems. In some embodiments, the delivering content metadata system may indicate that a portion of the metadata is replaceable and/or modifiable with other data and/or content metadata. For example, a portion of an advertising enhancement may be replaceable and/or otherwise modifiable with the name or logo of the content distributor. As another example, an advertisement for a product may be replaceable and/or otherwise modifiable with a store location in the vicinity of the client device (e.g., street address, zip code, telephone area code) where the product may be purchased. As a further example, where the metadata includes social media tags, the application server may append to the list of social media tags the content distributor, local station name, channel name and/or channel number (e.g. "#KABX17") that is currently displaying the content. This post-receipt replacement, modification, and/or insertion of the delivered and/or determined metadata may include one or more additional transmissions and/or determinations of content metadata, for example by the one or more content metadata systems (e.g., steps 707 and 709 may occur more than once). Further, in some embodiments, replacement, modification and/or insertion may be performed prior to display by the client device, for example using previously delivered content metadata, client device preferences and/or settings. This previously delivered content metadata may include, for example, client-stored metadata, and client device preferences and/or settings may include, for example, information pertaining to one or more users of the client device, including name, age, birthdate, social network identifiers (e.g., usernames, handles, and the like), e-mail addresses, friend information, and the like.

After any optional post-receipt steps are performed, in step 713 the content metadata may be transmitted to the one or more devices, including the requesting client device, another device associated with the user of the client device and/or the client device (e.g., another wired or wireless computing device, a mobile device, applications and/or modules of the requesting client device or another device) or the like.

One or more aspects of the disclosure may be embodied in computer-usable or readable data and/or executable instructions, such as in one or more program modules, executed by one or more processors or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving a list comprising:
      a plurality of time points of a content item;
      a list of supplemental content items for a first application, corresponding to the time points; and
      a list of supplemental content items for a second application, corresponding to the time points, wherein the first application is different from the second application;
   determining, by a computing device, that a current time point of the content item is being output; and
   based on the receiving the list and the determining:
      causing the first application to output a first supplemental content corresponding to the current time point of the content item; and
      causing the second application to output a second supplemental content corresponding to the current time point of the content item.

2. The method of claim 1, wherein the content item comprises:
   a first advertisement associated with the current time point, and wherein the second supplemental content comprises a second advertisement related to the first advertisement and associated with the second time current time point.

3. The method of claim 2, wherein the first advertisement is formatted in a first format, and wherein the second advertisement is formatted in a second format.

4. The method of claim 1, wherein the output of the supplemental content via the first application comprises playback of the supplemental content, and wherein the second application comprises a social media application or a web browser application.

5. The method of claim 1, further comprising:
   correlating the current time point with a first metadata of a first advertisement; and
   correlating the current time point with a second metadata, of a second advertisement, different from the first metadata.

6. The method of claim 1, wherein the content item comprises an event, and wherein the first supplemental content and the second supplemental content are associated with a point in time associated with the event different from the current time point.

7. The method of claim 1, further comprising:
   determining, based on a type of the second application, one or more portions, of the second application, to be modified,
   wherein causing the second application to output the second supplemental content comprises causing the second application to replace content of the one or more portions with the second supplemental content.

8. The method of claim 1, wherein:
   the first application comprises a web browser application;
   the second application comprises a social media application;
   the supplemental content items for the first application have a first file format; and
   the supplemental content items for the second application have a second file format, different from the first file format.

9. A method comprising:
   receiving, by a computing device, a plurality of time indicators, wherein each time indicator of the plurality of time indicators associates a time point in a content item with:
      first content metadata for a first type of interactive application; and
      second content metadata for a second type of interactive application;
   outputting, by the computing device and for display, a first portion of the content item;
   receiving a trigger indicating that a first interactive application has been selected for display, wherein the first interactive application is one of the first type of interactive application or the second type of interactive application;
   outputting, for display and based on the trigger, the first interactive application;
   determining, by the computing device and based on a current time, within the first portion of the content item, a first time indicator of the plurality of time indicators;
   selecting, by the computing device and based on the first time indicator and whether the first interactive application is the first type of interactive application or the second type of interactive application, one of the first content metadata or the second content metadata for the first interactive application; and
   sending the selected content metadata for output by the first interactive application.

10. The method of claim 9, further comprising:
    terminating the outputting of the first portion of the content item; and
    populating one or more portions of the first interactive application with the first content metadata, wherein the first content metadata comprises a second portion of the content item.

11. The method of claim 10, wherein the first portion of the content item comprises a first advertisement, and wherein the first content metadata comprises a second advertisement related to the first advertisement.

12. The method of claim 10, wherein the first interactive application comprises a social media application, and populating one or more portions of the first interactive application comprises populating one or more fields of the social media application based on a subset of the first content metadata that is correlated with the second first time indicator.

13. The method of claim 10, wherein the first interactive application comprises a web browser application, and populating one or more portions of the first interactive application comprises populating one or more fields of the web browser application based on the first content metadata that is correlated with the second first time indicator.

14. The method of claim 9, wherein the first portion of the content item comprises a first advertisement that is formatted in a first format, and wherein the first content metadata comprises a second advertisement related to the first advertisement, and the second advertisement is formatted in a second format.

15. A method comprising:
   inserting, by a computing device and into a content item, a plurality of time indicators, wherein each time indicator of the plurality of time indicators associates a time point in the content item with:
      first content metadata for a first type of interactive application; and
      second content metadata for a second type of interactive application;
   receiving, by the computing device;
      a first message indicating that a first interactive application on a second computing device has been launched, and
      a first time indicator of the plurality of time indicators;
   selecting, based on the first time indicator and whether the first interactive application is the first type of interactive application or the second type of interactive application, one of the first content metadata or the content second metadata for the first interactive application; and
   sending, to the first interactive application on the second computing device, the selected content metadata.

16. The method of claim 15, wherein the content item comprises a first advertisement having a first format, and wherein the first content metadata comprises a second advertisement related to the first advertisement.

17. The method of claim 15, wherein the content item comprises an event occurring for a portion of a duration of the content item, and
   wherein the first time indicator is correlated with an advertisement related to the event.

18. The method of claim 15, wherein the first type of interactive application is a web browser application with a first input format, and wherein the second type of interactive application is a social media application with a second input format different from the first input format.

* * * * *

UNITED STATES PATENT AND TRADEMARK OFFICE
CERTIFICATE OF CORRECTION

PATENT NO. : 11,783,382 B2
APPLICATION NO. : 14/520819
DATED : October 10, 2023
INVENTOR(S) : Patel et al.

It is certified that error appears in the above-identified patent and that said Letters Patent is hereby corrected as shown below:

On the Title Page

Column 2, item (56) Other Publications, Line 1:
Delete "Nov. 2, 20179" and insert --Nov. 29, 2017-- therefor Page 2, Column 2, item (56) U.S. Patent Documents, Line 55:
Delete "3,006,262 A1" and insert --8,006,262 B2-- therefor Page 2, Column 2, item (56) U.S. Patent Documents, Line 56:
Delete "3,032,914 A1" and insert --8,032,914 B2-- therefor Page 5, Column 1, item (56) Other Publications, Line 3:
Delete "Actoin" and insert --Action-- therefor Page 5, Column 2, item (56) Other Publications, Line 11:
Delete ""Bitstieam" and insert --"Bitstream-- therefor In the Specification Column 4, Detailed Description, Line 47:
Delete "110" and insert --120-- therefor Column 6, Detailed Description, Line 15:
Delete "HTMLS," and insert --HTML5,-- therefor Column 6, Detailed Description, Line 67:
After "application.", delete "¶"

Column 10, Detailed Description, Line 42:
Delete "440$d$-4401" and insert --440$d$-440$l$-- therefor Signed and Sealed this
Twelfth Day of November, 2024

*Katherine Kelly Vidal*
Katherine Kelly Vidal
*Director of the United States Patent and Trademark Office*

CERTIFICATE OF CORRECTION (continued)
U.S. Pat. No. 11,783,382 B2

Column 12, Detailed Description, Line 50:
After "X.", delete "¶"

In the Claims

Column 19, Claim 2, Line 55:
After "the", delete "second time"

Column 21, Claim 12, Line 3:
After "on", delete "a subset of"

Column 21, Claim 12, Line 4:
After "the", delete "second"

Column 21, Claim 13, Line 10:
After "the", delete "second"

Column 21, Claim 15, Line 27:
Delete "device;" and insert --device:-- therefor